(12) United States Patent
Gremaud

(10) Patent No.: US 12,255,986 B2
(45) Date of Patent: Mar. 18, 2025

(54) REMOTELY VERIFYING DEVICE INTEGRITY

(71) Applicant: Nagravision Sárl, Cheseaux-sur-Lausanne (CH)

(72) Inventor: Fabien Gremaud, Cheseaux-sur-Lausanne (CH)

(73) Assignee: Nagravision Sárl, Cheseaux-sur-Lausanne (CH)

( * ) Notice: Subject to any disclaimer, the term of this patent is extended or adjusted under 35 U.S.C. 154(b) by 200 days.

(21) Appl. No.: 17/299,004

(22) PCT Filed: Nov. 29, 2019

(86) PCT No.: PCT/IB2019/001279
§ 371 (c)(1),
(2) Date: Jun. 2, 2021

(87) PCT Pub. No.: WO2020/115545
PCT Pub. Date: Jun. 11, 2020

(65) Prior Publication Data
US 2022/0052842 A1    Feb. 17, 2022

(30) Foreign Application Priority Data
Dec. 3, 2018  (EP) .................................... 18209909

(51) Int. Cl.
*H04L 9/08*   (2006.01)
*H04L 9/40*   (2022.01)

(52) U.S. Cl.
CPC .......... *H04L 9/0825* (2013.01); *H04L 9/0869* (2013.01); *H04L 63/166* (2013.01)

(58) Field of Classification Search
None
See application file for complete search history.

(56) References Cited

U.S. PATENT DOCUMENTS 8,856,513 B2 * 10/2014 Srinivasan ............ H04L 9/3066
                                                                     713/157
9,577,829 B1 *  2/2017 Roth ....................... G06F 21/60
(Continued)

FOREIGN PATENT DOCUMENTS

GB          2398713 A  *  8/2004  ............. G06F 21/62
WO     20110130211 A1     10/2011

OTHER PUBLICATIONS

Steffen Schulz et al: "Boot Attestation: Secure Remote Reporting With Off-The-Shelf IOT Sensors", IACR, International Association for Cryptologic Research, vol. 20170703: 110052, Jul. 3, 2017.

(Continued)

*Primary Examiner* — Bassam A Noaman
(74) *Attorney, Agent, or Firm* — Maier & Maier, PLLC

(57) ABSTRACT

A computer-implemented method for use by a client device is provided. The client device comprises a memory and is configured to send data according to a cryptographic protocol that uses a key. The method comprises: generating a data unit and a seed related to the data unit; generating a measurement result of the client device related to the seed; generating an attestation key based on the measurement result and a key that is agreed in accordance with the cryptographic protocol; encrypting the data unit at least in part based on the attestation key; and generating an output comprising the encrypted data unit. Related methods for use by a server device and a network component, and related client device, server device and network component are also provided.

19 Claims, 8 Drawing Sheets

(56) References Cited

U.S. PATENT DOCUMENTS

| | | | | |
|---|---|---|---|---|
| 10,484,354 B2* | 11/2019 | Casella | ............. | H04L 9/088 |
| 10,523,688 B1* | 12/2019 | Ryon | ............. | G06F 21/44 |
| 2004/0010700 A1* | 1/2004 | Mont | ............. | H04L 9/3073 |
| | | | | 705/51 |
| 2004/0165728 A1* | 8/2004 | Crane | ............. | G06F 21/62 |
| | | | | 380/279 |
| 2011/0041178 A1 | 2/2011 | Jakobsson et al. | | |
| 2011/0185071 A1* | 7/2011 | Schmieder | ............. | H04L 69/26 |
| | | | | 709/228 |
| 2015/0372991 A1* | 12/2015 | Katz | ............. | H04L 9/0819 |
| | | | | 713/168 |
| 2017/0103209 A1 | 4/2017 | England et al. | | |
| 2017/0242961 A1* | 8/2017 | Shukla | ............. | G16B 50/00 |
| 2018/0234255 A1* | 8/2018 | Fu | ............. | H04L 9/30 |
| 2018/0288052 A1* | 10/2018 | Sambandam | ............. | H04L 63/10 |
| 2018/0288097 A1* | 10/2018 | Poornachandran | ............. | G06F 21/55 |

OTHER PUBLICATIONS

Examination Report on Patentability issued on Jun. 6, 2024, in corresponding European Application No. 19 842 398.0, 9 pages.

* cited by examiner

REMOTELY VERIFYING DEVICE INTEGRITY

TECHNICAL FIELD

The present disclosure relates to methods and devices for data communication, secured communication and remote integrity verification. The disclosure further relates to a computer program product and a computer-readable non-transitory storage medium.

BACKGROUND ART

The integrity of a device, such as an electronic device, may be verified by an embedded secure boot. Device integrity may also be remotely verified using schemes such as remote attestation.

Under a remote attestation scheme, a device—such as a client device—reports measurements thereof to another remotely located device—such a host—for remote verification. For example, a software company may use a remote attestation scheme to remotely detect attempts to make unauthorized changes to the company's software.

However, the measurements to be remotely reported may be corrupted if the they are easily identifiable. As such, the remote attestation scheme is compromised.

Moreover, remote attestation schemes that require a large amount of resources, such as power, bandwidth and computing power, may be impractical for devices with limited resources.

Therefore, there is a need for a better way to verify device integrity remotely.

SUMMARY

One of the objects of the present disclosure is to provide an improved way to remotely verify the integrity of a device. One of the objects of the present disclosure is to provide devices (such as client device, host device, local device and remote device), apparatuses, components, methods, protocols, computer programs, computer program products and computer-readable non-transitory storage medium associated with such improved way for remote device integrity verification.

In the context of the present disclosure, the term "device" should be construed broadly and is not particularly limited to any specific type, function, size, etc.

According to an aspect of the present disclosure, a computer-implemented method for use by a client device is provided. The client device may comprise a memory. The client device may be configured to send data securely. In an embodiment, the client device may be configured to send data according to a cryptographic protocol. In an embodiment, the cryptographic protocol may use a key. The method may comprise generating a data unit and a seed related to the data unit; generating a measurement result related to the seed; generating an attestation key based on the measurement result and a key that may be agreed in accordance with the cryptographic protocol; and encrypting the data unit at least in part based on the attestation key. The method may comprise generating an output comprising the encrypted data unit. In an embodiment, the measurement result may be of the client device. In an embodiment, the measurement result is related to a status of the client device. In an embodiment, the method may comprise sending the encrypted data unit.

In other words, how the data unit is encrypted may depend on at least the following factors: the seed of the data unit, the key used in the cryptographic protocol, and the measurement result of the client device. If any one of the factors is altered, then the encryption key is also altered. A receiver that is remote from the client device and attempts to decrypt the data unit it receives from the client device with the same key may then fail at the decryption. In an embodiment, the receiver may be a host device communicating with the client device.

That is, since the encryption of the data unit depends on said factors, any failure in the decryption attempt may signal an alternation to at least one of said factors. For example, if the seed of the data unit is known to both the client device and the receiver and the key is agreed therebetween, then a failed decryption attempt may indicate a change in the measurement result of the client device. In this way, such change may be detected by the receiver: the change is automatically indicated upon a failed decryption attempt. In the embodiment in which the measurement result is related to the status of the client device, a failed decryption attempt may signal a change to the status of the client device, e.g., undesired or unauthorized change to any part of the client device, be it hardware or software.

Other the other hand, a successful decryption attempt may indicate that none of the factors behind the encryption of the data unit is or has been altered. Encryption usually makes use of an encryption and an authentication scheme such as AES-GCM or AES-CCM. Thus, using a wrong key would lead to a corrupted authentication detection. A series of successful decryption attempts may indicate a relatively stable measurement result of the client device. In the embodiment in which the measurement result is related to the status of the client device, a series of successful decryption attempts upon receipt of the encrypted data units sent by the client device may indicate a stable status of the client device, e.g., no undesired or unauthorized change to any part of the client device, be it hardware or software. That is, a relatively stable status of the client device may be automatically indicated to the receiver without additional computation other than routine decryption.

Since changes or the lack thereof to the factors behind the encryption of the data units may be automatically inferred from failure or success of decrypting data units, the receiver receiving the data units would not need to spend significantly extra computational power to detect such changes or the lack thereof. Also, the data units would not have to include additional information and may preserve their current format. A further benefit from keeping the same data unit format is that the bandwidth for transmitting/receiving such data units is kept the same; this could particularly benefit client devices which have limited computational and/or bandwidth resource but still need to (periodically) prove the lack of changes to the factors behind the encryption of outgoing data units.

In an embodiment, the client device may be an electronic device, such as a laptop computer and a desktop computer. In an embodiment, the client device may be a mobile device, such as a feature phone, a smartphone and a tablet. In an embodiment, the client device may be a media device, such as a (digital) TV and a media player. In an embodiment, the client device may a (electronic) data collection device, such as a sensor; the type of sensor is not particularly limited. In an embodiment, the client device may be capable of sending and/or receiving digital data. In an embodiment, the client device may participate in a digital communications network, such as the Internet. In an embodiment, the client device may be an Internet of Things (IoT) device. In an embodiment, the client device may be a smart home appliance. In an embodiment, the client device may be a smart meter that is optionally suitable for industrial, enterprise and/or municipal uses. In an embodiment, the client device may be a network communication client.

In an embodiment, the seed may be so determined as to be unique to the data unit. Such uniqueness may be permanent. Such uniqueness may be temporary, e.g., the seed is unique only for a certain number of data units, only during a certain amount of time, or only during a predetermined communication session between the client device and the receiver. Such seed uniqueness may help identify the data unit. In an embodiment, the seed is deterministic.

In an embodiment, the seed may be so determined as to uniquely identify the data unit. In an embodiment, the seed is not encrypted when the data unit is being encrypted. In an embodiment, the seed may be a sequence number related to the data unit. In an embodiment, the seed may be in a header portion of the output, which output may be unencrypted while another portion of the output is encrypted. The sequence number may be related to or defined in the cryptographic protocol. Using the sequence number as the seed may be a more effective use of information already related to the data unit and may therefore save resources such as bandwidth. In an embodiment, the sequence number may have an explicit relationship with the data unit or may be implicitly inferred from the data unit. In an embodiment, the output may comprise the seed.

In an embodiment, the measurement result of the client device may at least depend on whether the client device has been altered. In an embodiment, the measurement result may be related to the memory or at least a portion of the memory. The measurement result may change if at least a portion of the memory has been altered. For example, if the memory comprises secured data or software resistant to tampering attempts, then a compromise to the secure data or an (unauthorized) modification and/or tampering may be reflected in a change to the measurement result. For example, if such change exists in the measurement result, then the attestation key and thus the encryption of the data unit would be altered, leading to failed attempts to decrypt the data units; a receiver detecting such failed attempts may thus be aware of potential compromise to the supposedly secured data in the remote client device and/or unauthorized tampering of software in the remote client device.

It should be noted that in the context of the present disclosure, the term "memory" should not be construed in a narrow manner. Any devices, components and apparatuses that can permanently or temporarily hold information may be a "memory". Random Access Memory (RAM) may be a type of memory, but the term "memory" is not limited thereto. The memory may be part of or reside in the client device but may also be externally coupled to the client device. A semiconductor memory chip may be a memory. A cache may be a memory. A hard disk (magnetic) may be a memory. An optical storage medium such as CD, DVD and Blu-ray may be a memory.

In an embodiment, the generating or generation of the measurement result may be pseudo-random. Pseudo-randomness in the generation of the measurement result in the client device may enable replicating such generation outside of the client device. For example, the client device may have been wholly or partly replicated from a reference device. For example, when an electronic device is manufactured, it may contain software and/or data replicated from a software and/or data repository in the manufacturing facility. If the data unit encrypted by the client device cannot be decrypted by the receiver while the data unit encrypted by the reference client device can be correctly decrypted by the same receiver, then this could be an indication that the client device has in some manner deviated from the reference client device. The receiver may keep this indication or report this indication to other parties or devices (e.g., those in the same network as the receiver).

In an embodiment, the encrypting or encryption of the data unit may be performed in accordance with the cryptographic protocol. In an embodiment, the client device may be configured to send data over a secure channel. Communication over the secure channel may be conducted in sessions. The secure channel may involve cryptographic operations, such as key exchanges, key negotiation, encryption and decryption. Data being transported over the secure channel may be in whole or in part encrypted. The encryption may be performed with the key. The key may be negotiated according to the cryptographic protocol or may be fixed.

In an embodiment, the the cryptographic protocol may be an existing cryptographic protocol, a proprietary cryptographic protocol and/or a non-proprietary cryptographic protocol. Using existing and/or non-proprietary cryptographic protocols may reduce the development for related hardware/software products and services. Using a proprietary cryptographic protocol, on the other hand, may enable the provision of customized security products and services. In an embodiment, the cryptographic protocol may be Transport Layer Security (TLS) or Datagram Transport Layer Security (DTLS); each may have its own distinctive benefits. For example, DTLS may work with User Datagram Protocol (UDP) and provides an explicit sequence number (in the header), which may readily serve as the seed. For example, TLS may work over an existing Transmission Control Protocol (TCP) and provide an implicit sequence number.

According to an aspect of the present disclosure, a computer-implemented method for use by a server device is provided. The server device may be configured to receive data securely. The server device may be configured to receive data according to a cryptographic protocol. In an embodiment, the cryptographic protocol may involve the use of a key. The method may comprise receiving an input comprising an encrypted data unit; deriving a seed related to the encrypted data unit; requesting an attestation key based on the seed and the key; receiving the attestation key in response to the requesting; and decrypting the encrypted data unit at least in part based on the attestation key.

The decryption is based on the attestation key, which in turn depends on at least the seed that may be derived from the incoming input and the key that may have been negotiated according to the cryptographic protocol. Therefore, the decryption result (success or failure) is at least indicative of the correctness of derivation of the seed and the status or validity of the previously negotiated key. If the correctness of the seed and the validity of the key can be ascertained (which two conditions are not unusual), then the decryption result (success or failure) may also be indicative of the correctness of another factor that impacts the attestation key. That is, by associating the attestation key used for decrypting incoming data, the server can deduce additional information from the decryption result. For example, if the attestation key is related to the integrity of a remote device that is in data communication with the server device, then a successful decryption result may indicate a wholly or partially verified integrity of the remote device whereas a failed decryption result may indicate a tampered/compromised integrity of the remove device.

The server device is capable of data communication with another remotely located device but otherwise not limited to any particular function, size, complexity or cost. The server device may be in data communication with a plurality of remotely located devices. The server device may be a part of or participate in a data communication network.

In an embodiment, the seed may be so determined as to be unique to the data unit. Such uniqueness may be permanent. Such uniqueness may be temporary, e.g., the seed is unique only for a certain number of data units, only during a certain amount of time, or only during a predetermined communication session between the service device and another device in data communication with the server device. Such seed uniqueness may help identify the data unit. In an embodiment, the seed is deterministic.

In an embodiment, the seed may be so determined as to uniquely identify the data unit. The seed may be unencrypted. In an embodiment, the seed may be a sequence number related to the encrypted data unit. In an embodiment, the seed may be in a header portion of the input, which input may be unencrypted while another portion of the input is encrypted. The sequence number may be related to or defined in the cryptographic protocol. Using the sequence number as the seed may be a more effective use of information already related to the encrypted data unit and may therefore save resources such as bandwidth. In an embodiment, the sequence number may have an explicit relationship with the encrypted data unit or may be implicitly inferred from the encrypted data unit.

In an embodiment, the server device may request the attestation key from another device in which the server device is located, such as a network component, a database and a back-end component. The server device may forward the seed and/or the key to such device when requesting the attestation key. In an embodiment, the server device may receive the attestation key from such device. Making information on factors affecting the decryption other than the seed and/or the key to be provided by a database or a back-end component remote from the server device may reduce the computational load of the server device in generating the attestation key. Nevertheless, it is also possible that the server device itself is capable of, e.g., through a hardware and/or software module integral to the service device, generating the attestation key. In that event, the service device itself can, e.g., determine the integrity of the client device it is receiving encrypted data from, based on the decryption result (success or failure). In an embodiment, the key for encrypting/decrypting data according to the cryptographic protocol may be negotiated or may be fixed.

In an embodiment, the server device may authenticate the client device from which it is receiving encrypted data after a predetermined number of successful decryption. Such "silent" authentication or integrity verification of the remote client device may help preserve computational or communication resources. In an embodiment, the server device may generate a report or an alarm after a predetermined number of failed decryption. In an embodiment, the server device may send the report or alarm to a database or a back-end component in the same communication network, optionally to the same database or back-end component from which the server device has received the attestation key. In an embodiment, a result of the decrypting is reported.

According to an aspect of the present disclosure, a computer-implemented method for use by a network component may be is provided. The method may comprise receiving a seed and a key; generating an attestation key based on the seed, the key and a reference measurement result in response to said receiving; and generating an output comprising the generated attestation key. In an embodiment, the network component may be a database. In an embodiment, the key may be related to a cryptographic protocol.

The reference measurement result may reflect, e.g., a particular or desirable status of the certain type of device. For example, the reference measurement result may be indicative of a newly manufactured electronic device (such as a remote sensor) loaded with secured software. If the secured software is tampered with, then a subsequent measurement result of the electronic device may deviate from the reference measurement result. If an attestation key for decryption is a function of a seed, a key and a third factor that may include a measurement result of the remote sensor, then the network component may, upon receiving the seed and the key, generate the attestation key with its knowledge of the third factor. The attestation key generated by the network component may be sent upon request to, e.g., a server device attempting to decrypt encrypted data unit received from the remote sensor and may help the server device determined whether the measurement result of the remote sensor has deviated from the reference measurement result through the success or failure of the decryption.

In an embodiment, the network component may comprise a memory and the reference measurement result may be related to the memory. For example, the memory in the network component may store a secured, untampered version of the software that should exist in a mass-manufactured client device (e.g., a remote sensor capable of network communication). If any of such mass-manufactured client devices attempts to exchange data with a service device through a secured communication channel, then the service device may query the network component for the proper attestation key(s) to decrypt the encrypted data units from the client device. If the network component provides the proper attestation key(s) according to the reference measurement result but the server device fails to decrypt the encrypted data units from the client device, then this may be indicative of tampered or compromised software in the client device. Since there may be a wide variety of client devices attempting to securely communicate with a certain server device, it might be difficult for the server device to generate proper attestation key(s) for each type of client devices if the server device is limited in computational, communication or memory resources. The network component may then server as a database or network back-end to satisfy the decryption and security need for such server device.

In an embodiment, the seed may be a first seed. In an embodiment, the attestation key may be a first attestation key. In an embodiment, the method of the abovementioned aspect of the present disclosure may comprise receiving a second seed. The second seed may be different from the first seed. The method may alternatively or additionally comprise receiving a second key, which may be from the first key. The method may comprise generating a second attestation key in response thereto. The generation of the second attestation key may be based on the second seed, the second key, a second reference measurement, or any combination of the aforesaid. The second reference measurement may differ from the first reference measurement. The method may comprise generating a second output comprising the generated second attestation key.

If some of the factors in the generation of the attestation keys are known beforehand or exist in a certain pattern, then it could be more efficient to compute and provide them in batches upon inquiry. For example, the seed may be the sequence number of the data unit (e.g., packet, datagram, etc.) used a communication/cryptographic protocol and hence predictable. Thus, it could be more efficient to receive the sequence number in batches and generate the attestation keys in batches. The same applies to the key. In an embodiment, the seed changes more frequently than the key. For example, the seed may change from frame to frame or from datagram to datagram whereas the key, once negotiated, may stay identical for an extended period of time. In that event, batches of attestation keys may be computed with the same key upon receiving batches of seeds. Also, in some embodiment, the reference measurement result may be a partial measurement result. Hence, different attestation keys generated from different partial measurement results may help increase the robustness of the remote integrity verification.

According to an aspect of the present disclosure, a client device may be provided. The client device may participate in network communication. The client device may be configured to send data according to a cryptographic protocol. The cryptographic protocol may use a key. The client device may comprise a memory, a data-generation module, a measurement module, a key-generation module, an encryption module, and an output-generation module. The data-generation module may be configured to generate a data unit and a seed related to the data unit. The measurement module may be configured to generate a measurement result of the client device related to the seed. The key-generation module may be configured to generate an attestation key based on the measurement result. The generation of the attestation key may additionally or alternatively be based on a key. The key may be agreed in accordance with the cryptographic protocol. The encryption module may be configured to encrypt the data unit at least in part based on the attestation key. The output-generation module may be configured to generate an output comprising the encrypted data unit.

Such client device may encrypt outgoing data units with keys that are a function of its measurement result. Therefore, the decryption status (success or failure) of the encrypted data units may be indicative of a change to the measurement result of the client device. In an embodiment, the measurement result may be related to the memory. In an embodiment, the measurement result may reflect the status of a part of the memory. In an embodiment, the measurement result may be a partial measurement result of the memory. In such embodiments, changes to the memory of the client device (such as malign attempts to alter the software stored in the memory of the client device) may be reflected in the decryption attempts of a receiving side of the client device's encrypted data. It is emphasized that the client device may have similar embodiments, effects and advantages as the above-described computer-implemented methods for use by a client device.

According to an aspect of the present disclosure, a server device may be provided. The server device may participate in network communication. The server device may be configured to receive data according to a cryptographic protocol. The cryptographic protocol may use a key. The received data may come from a client device in secure communication with the server device. The server device may comprise a receiving module, a derivation module, a transmitting module, and a decryption module. The receiving module may be configured to receive an input comprising an encrypted data unit. The derivation module may be configured to derive a seed related to the encrypted data unit. The transmitting module may be configured to transmit a request for an attestation key based on the seed and the key. The receiving module may be additionally configured to receive the attestation key in response to the request. The decryption module may be configured to decrypt the encrypted data unit at least in part based on the attestation key.

The decryption is based on the attestation key, which in turn depends on at least the seed that may be derived from the incoming input and the key that may have been negotiated (or fixed) according to the cryptographic protocol. Therefore, the decryption result (success or failure) is at least indicative of the correctness of derivation of the seed and the status or validity of the previously negotiated (or fixed) key. If the correctness of the seed and the validity of the (or fixed) key can be ascertained (which two conditions are not unusual), then the decryption result (success or failure) may also be indicative of the correctness of another factor that impacts the attestation key. That is, by associating the attestation key used for decrypting incoming data, the server can deduce additional information from the decryption result. For example, if the attestation key is related to the integrity of a remote device that is in data communication with the server device, then a successful decryption result may indicate a wholly or partially verified integrity of the remote device whereas a failed decryption result may indicate a tampered/compromised integrity of the remove device. It is emphasized that the server device may have similar embodiments, effects and advantages as the above-described computer-implemented methods for use by a server device.

According to an aspect of the present disclosure, a network component is provided. The network component may participate in a network communication. The network component may be a database. The network component may be a back-end, e.g., a security back-end. The network component may comprise a receiving module, a key-generation module and a transmitting module. The receiving module may be configured to receive a seed and a key. The key-generation module may be configured to generating an attestation key based on the seed, the key and a reference measurement result in response to said receipt. The transmitting module may be configured to transmit an output comprising the generated attestation key.

The network component may generate, upon receiving a seed and a key from, e.g., a server device that is in secure communication with a remote client device and wishes to remotely verify the integrity of the client device. Among the three factors that may affect the key used to decrypt data units sent from the client device, the seed and the key may be handled by the server device; and the reference measurement result may be supplied by the network component. This arrangement may provide a more specialized hardware/software setup and therefore promote efficiency. It is emphasized that the network component may have similar embodiments, effects and advantages as the above-described computer-implemented methods for use by a network component.

According to an aspect of the disclosure, a computer program product is proposed. The computer program product can be implemented on a computer-readable non-transitory storage medium. The computer program product can comprise computer executable instructions which, when executed by a processor, cause the processor to carry out one or more of the steps of any of the above described methods, be they for use in a client device, a server device or a network component.

According to an aspect of the disclosure, a computer-readable non-transitory storage medium is proposed, comprising computer executable instructions which, when executed by a processor, cause the processor to carry out one or more of the steps of the above described methods, be they for use in a client device, a server device or a network component.

The wording first, second, third and fourth as used in the claims is not intended to indicate any particular order. This wording is used to label different elements for distinguishing the elements.

Hereinafter, embodiments of the disclosure will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Figure 1:
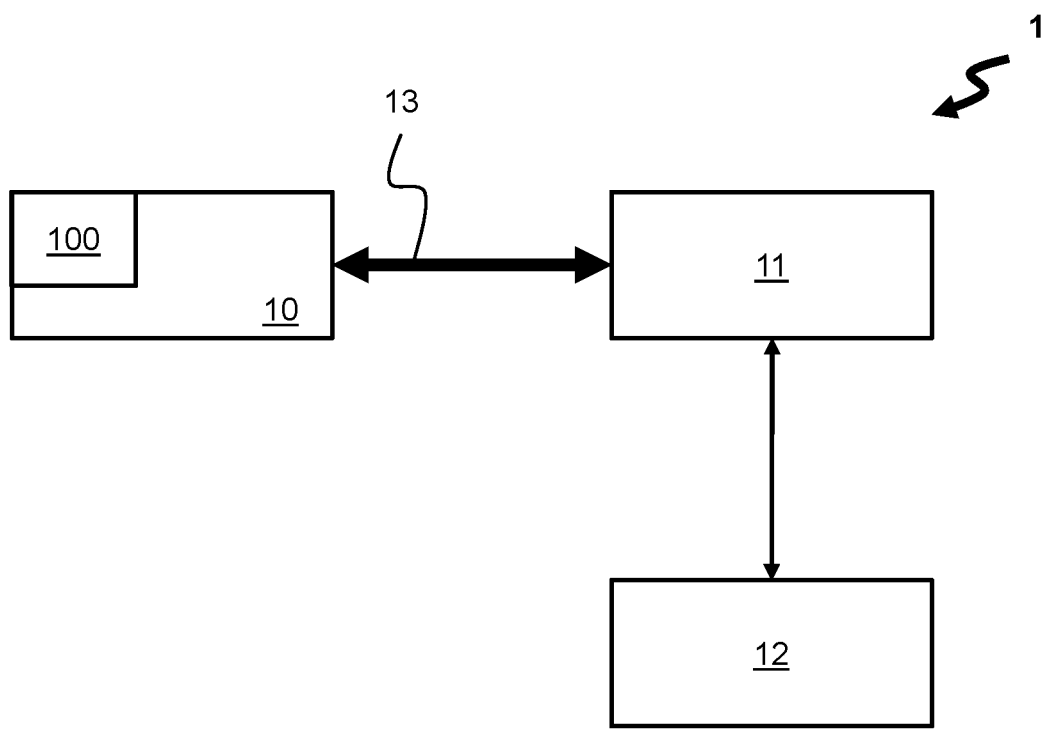
FIG. 1 illustrates an exemplary network in accordance with an embodiment of the present disclosure.

Refer to FIG. 1, which illustrates an exemplary network 1 in accordance with an embodiment of the present disclosure. The network 1 comprises a client device 10, a service device 11 and a network component 12. The client device 10 may be referred to as "client". The server device 11 may be referred to as "server". The network component 12 may be referred to as a "network node". The client 10 can be in communication with the server 11 via a communication channel 13. The network component 12 may be in communication with the server 11; said communication may be secured.

The client 10 may participate in network communication. The type of the client 10 is not particularly limited. The client 10 may be an electronic device. The client 10 may be a computer (e.g., laptop and desktop), a mobile device (e.g., feature phone, smartphone and tablet), a media device (e.g., digital TV and media player), an electronic data collection device (e.g., sensor), an Internet of Things (IoT) device, a smart home appliance (e.g., smart refrigerator and smart air-conditioner), and a smart meter that is optionally suitable for industrial, enterprise and/or municipal uses.

The type of the server 11 is not particularly limited. The network 1 may be any device that can conduct data communication with one or more remotely located device, such as the client 10.

The communication channel 13 may be secured. The communication channel 13 may be established according to a cryptographic protocol. The cryptographic protocol may be open or proprietary. The communication channel 13 may conduct communication in sessions. The communication channel 13 may involve the use of a key. In an embodiment, the communication channel 13 may be established according to Datagram Transport Layer Security (DTLS). In an embodiment, the communication channel 13 may be established according to Transport Layer Security (TLS). The type of the communication channel 13 is, however, not particularly limited.

The client 10 may comprise a memory 100, which may be loaded with software. The hardware and/or software status of the client 10 may need to be verified from time to time. For example, whether the hardware and/or software of the client 10 has been tampered with may need periodic verification; in other words, the integrity of the client 10 may need periodic verification. Integrity verification may be particularly advantageous for client devices that have limited hardware and/or software resources to prevent unauthorized tampering and yet can participate in network communication because such devices, if compromised, may form a weak link in the security of the entire network. One way of verifying the integrity of the client 10 is via physical inspection, which however may not be ideal.

Another way of verifying the integrity of the client 10 is that it reports measurements on its status to an external device, which may be, for example, the server 11. The external device then determines the integrity of the client 10 based on the reported measurement results. Such methods may be called "remote attestation". For example, the client 10 may periodically send a copy of its entire memory 100 to a remote verifier, which upon receipt can compare the copy with a reference memory (which may also be called a reference image). If the software in the memory 100 of the client 10 has been tampered with, a comparison between the copy and the reference memory will yield differences. If, on the other hand, the remote verifier cannot find any differences between the reported copy of the memory 100 and the reference memory, then the remote verifier may confirm the integrity of the client 10 until the next round of verification.

The client 10 may report only a partial copy of its memory 100 for remote attestation. This can have the benefits of conserved communication bandwidth of the client 10. Other kinds of computation to enhance the security of the remote attestation procedure are also possible, such as hashing a selection of the memory 100, which may additionally reduce the required communication bandwidth for reporting the measurements. In an embodiment, a selected range of addresses of the memory 100 are reported.

The security of the reporting may be further improved. The communication bandwidth and/or computational resources may also be further conserved. It is recognized that the communication channel 13 through which the reported data from the client 10 are transported may be a secure channel. In a secure channel, a key may be negotiated between the two endpoints to encrypt and decrypt the data being transported over the channel. That is, the client 10 may negotiate a key with the server 11 at the initialization of a session of the secure communication channel 13. However, it is also possible that the key or key used in the secure communication channel 13 is fixed. Afterwards, both the client 10 and the server 11 use the key to encrypt the outgoing data and decrypt the incoming data. The data may be packets, datagrams or other formats, depending on the secured communication protocol used and/or the protocols in a layer neighboring the secured communication protocol used. In an embodiment where the TLS is used as the cryptographic protocol, the cypher suit TLS_ECDHE_ECDSA may be used to generate the key. Other know cypher suits are also possible. DTLS may also have its own cypher suits. However, how the key is generated is not particularly limited.

In an embodiment, the key that the client 10 uses to encrypt outgoing data is modified according to its hardware and/or software status (measurement result). The server 11 may also be aware of the modification algorithm. If the status of the client 10 is modified, the key that the client 10 uses to encrypt data through the secure communication channel 13 changes. If at this moment the server 11 uses the same key that it used to use for decryption, then the decryption will fail. That way, the server 11 may become automatically aware of the key change at the client 10 and may deduce that the status of the client 10 has been changed. In other words, the change of status of the client 10 (and the lack thereof) may be detected simply by encryption/decryption at the two ends of the communication channel 13. No additional data and/or computation may be needed. This is particularly suitable for conserving the communication and computation resources of the client 10 and the server 11.

The server 11 does not itself have to implement the algorithm that modifies the status of the client 10. Instead, the server 11 may query the network component 12 and forward the current key and the reference image. This could reduce the complexity of the server 11. In an embodiment, the reference image is stored in the network component 12; this could further reduce the storage cost of the server 11. For example, the network component 12 may be a security database that stores the reference image for a wide variety of client devices 10. When a server 11 needs to remotely verify the integrity of a client 10 communicating with the server 11, the server 11 may simply query the network component 12 for the appropriate key.

The measurement of the status of the client 10 may be pseudo-randomized. This may make it harder for security attackers to interfere with or copy the key modification process without being noticed. In an embodiment, the sequence number of the cryptographic protocol used for the communication channel 13 is used a seed to randomize the measurement result of the client 10. For example, DTLS uses an explicit sequence number in its header. Thus, randomizing the encryption key on the side of the client 10 would not pose any difficulty to the server 11 because it can also see the explicit sequence number in the incoming data and hence can generate a corresponding key for decryption. Or the server 11 may additionally forward the sequence number when the server 11 queries the network component 12 for the appropriate key. In an embodiment, TLS is used for the secure communication channel 13. In such a case, an implicit sequence number (by way of TCP) is still available as the seed to randomize the measurement of the client 10. In an embodiment, the randomization may be pseudo-randomization.

To put it succinctly, the idea behind the above-described embodiments may be expressed as the following two formulas:

$$\text{partialMeasurement}=\text{MeasurementFunction}(\text{sequenceNb},\text{deviceMemory}) \quad (1);$$

and $$\text{attestationKey}=KDF(\text{agreedKey},\text{partialMeasurement}) \quad (2),$$

where the KDF stands for "key generating function", MeasurementFunction is the pseudo-random function.

Formula (1) explains that the measurement of the status of the client 10 may be related to a part of the memory 100 of the client 10 (or its entirety) and may be a function of the sequence number of the data packet that the client 10 is to send out (one example being the above-described randomization). Formula (2) explains the attestation key, which is the actual key used to encrypt the outgoing data packets, depends on the measurement result and the key negotiated during the establishment of the communication session in the communication channel 13. If the server 11 can process and successfully authenticate the received data packets (or datagrams), then the partial measurement may become validated. The MeasurementFunction and the size of the measurement may be selected prior to the establishment of the session. An exemplary MeasurementFunction is provided below:

for($i=0$,measure=0,pseudoRandomValue=SHA256 (sessionNonce,sequenceNb);$i<100$;$i$++)

the client 10 measures its status where sessionNonce may uniquely identify a session to have different measure per session, e.g., can be a derived of the agreedKey.

Figure 2:
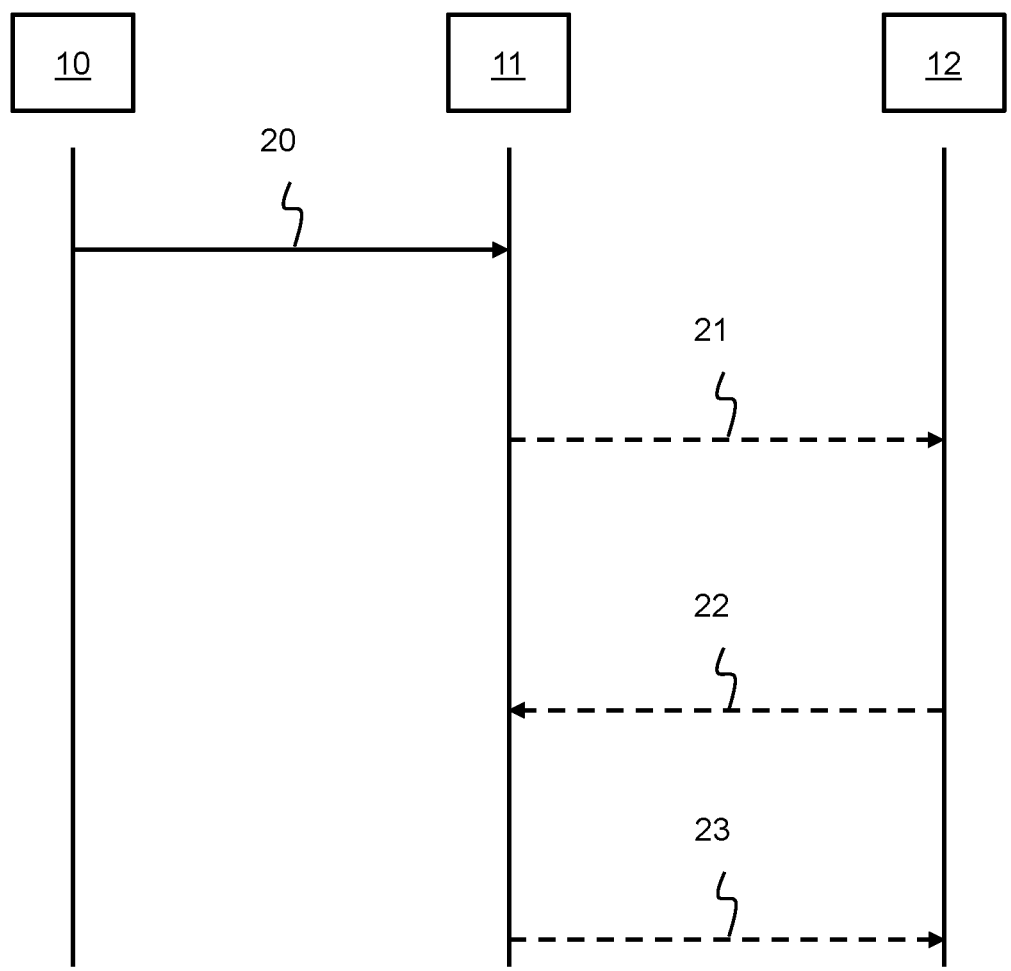
FIG. 2 schematically presents an exemplary remote integrity verification process according to an embodiment of the present disclosure.

FIG. 2 schematically presents an exemplary remote integrity verification process according to an embodiment of the present disclosure.

In this embodiment, a secured communication channel is established between the client 10 and the server 11, and a key has been negotiated or fixed to a value known to both the client 10 and the server 11. In a different embodiment, the key may be deterministic, e.g., the key may change over time but the client 10 and the server 11 are both aware of how the key changes over time. For example, there may be a hopping pattern for the key.

When the client 10 wishes to prove its integrity remotely to the server 11, the client 10 measures the its status (e.g., perform a predetermined computation on its memory 100) and modifies the key and uses the modified key to encrypt the data 20 to be transmitted. The modification may additionally depend on a seed, such as the sequence number of the data 20.

Upon receipt of the data 20, the server 11 attempts to compute a key based on the negotiated key and a measurement of a reference status of the client 10. The computation may be additionally based on a sequence number in the incoming data 20. If the key computed by the server 11 successfully decrypts the data 20 one or more times, then the server 11 may declare that the integrity of the client 10 has been remotely verified; otherwise, the client 10 fails the remote integrity verification.

The server 11 query the network component 12 for the modified key to decrypt incoming data 20. In so doing, the server 11 may forward data 21 containing any of the information required for computing the modified key. The network component 12 responds to the query by sending the data 22 containing the computed key. If the server 11 can use the key computed by the network component 12 to successfully decrypt the data 20 one or more times, then the server 11 may declare that the integrity of the client 10 has been remotely verified; otherwise, the client 10 fails the remote integrity verification. The server 11 may additionally report the verification status to the network component 12 by sending data 23.

Figure 3:
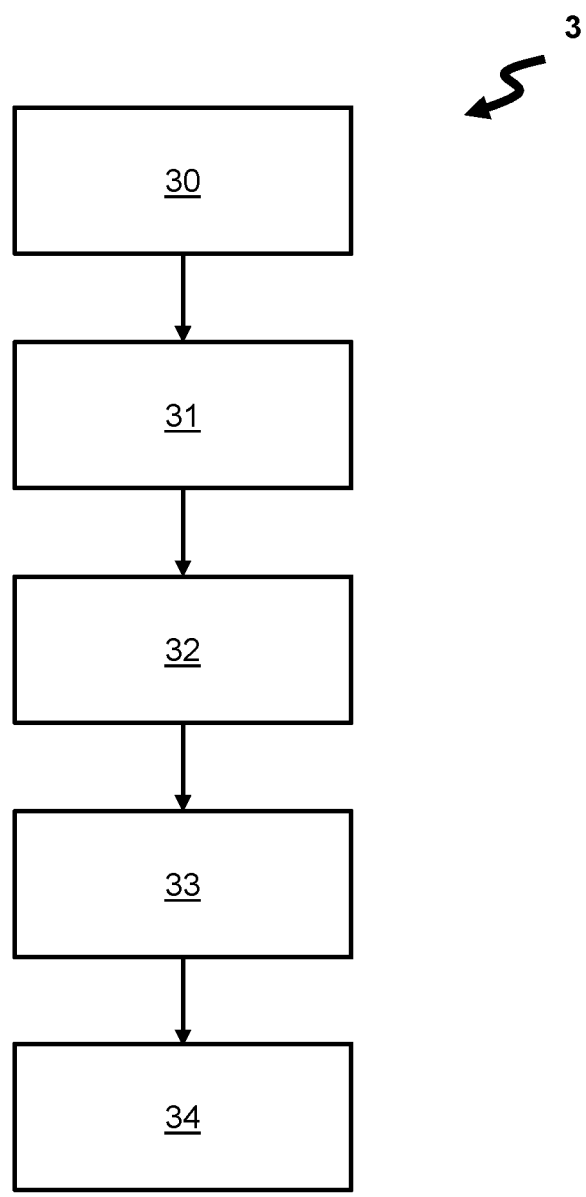
FIG. 3 illustrates an exemplary flow chart of a method in accordance with an embodiment of the present disclosure.

FIG. 3 illustrates an exemplary flow chart of a method 3 for use by a client device in accordance with an embodiment of the present disclosure. The method 3 may be implemented by a computer. The client device may comprise a memory and may be configured to send and/or receive data according to a cryptographic protocol. The cryptographic protocol may use a key. The key may be negotiated, variable or fixed. Unless explicitly stated, the order of the flow chart is exemplary and not limiting.

In step 30, a data unit and a seed related to the data unit may be generated. The seed may optionally be so determined as to be unique to the data unit. The seed may optionally be a sequence number related to the data unit.

In step 31, a measurement result of the client device may be generated. The measurement result may be related to the seed. The generation of the measurement result may optionally be pseudo-random. The measurement result may optionally be related to the memory.

In step 32, an attestation key may be generated based on the measurement result and a key determined in accordance with the cryptographic protocol. The key may optionally be negotiated in accordance with the cryptographic protocol. The key may optionally be deterministic.

In step 33, the data unit may be encrypted at least in part based on the attestation key. The encryption may optionally be in accordance with the cryptographic protocol.

In step 34, an output comprising the encrypted data unit may be generated. The output may optionally be transmitted to another device in communication with the client device. The communication may be done according to a cryptographic protocol.

Figure 4:
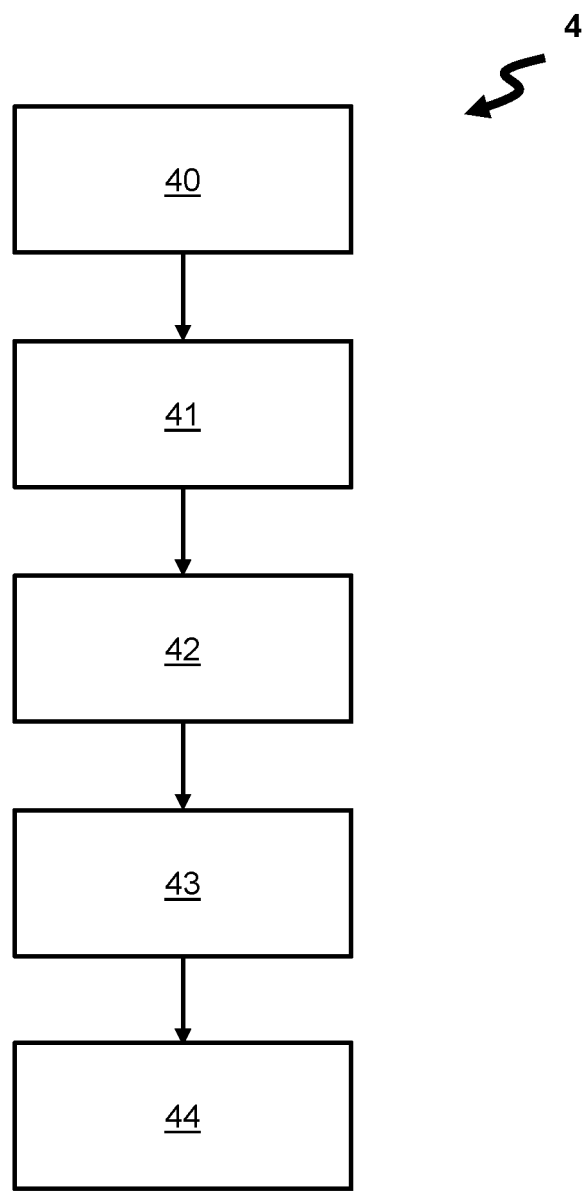
FIG. 4 illustrates an exemplary flow chart of a method in accordance with an embodiment of the present disclosure.

FIG. 4 illustrates an exemplary flow chart of a method 4 for use by a server device in accordance with an embodiment of the present disclosure. The method 4 may be implemented by a computer. The server device may be configured to send and/or receive data according to a cryptographic protocol. The cryptographic protocol may use a key. The key may be negotiated, variable or fixed. Unless explicitly stated, the order of the flow chart is exemplary and not limiting.

In step 40, an input may be received. The input may comprise an encrypted data unit.

In step 41, a seed may be derived. The seed may be related to the encrypted data unit. The seed may optionally be so determined as to be unique to the encrypted data unit. The seed may optionally be a sequence number related to the encrypted data unit.

In step 42, an attestation key may be requested. The attestation key may be based on the seed and the key. The key may optionally be negotiated in accordance with the cryptographic protocol. The key may optionally be deterministic. The attestation key may be requested from a network component.

In step 43, the attestation key may be received in response to the request.

In step 44, the encrypted data unit may be decrypted at least in part based on the attestation key. The decryption may optionally comprise authenticating the encrypted data unit.

Figure 5:
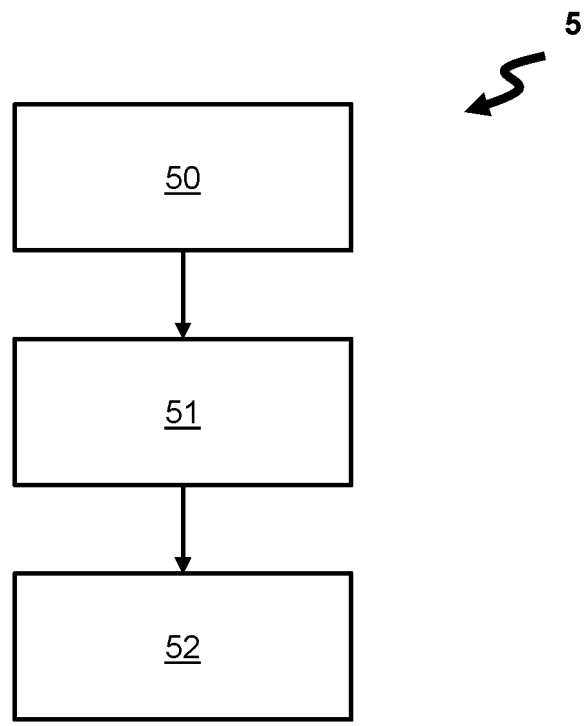
FIG. 5 illustrates an exemplary flow chart of a method in accordance with an embodiment of the present disclosure.

FIG. 5 illustrates an exemplary flow chart of a method 5 for use by a network component in accordance with an embodiment of the present disclosure. The method 5 may be implemented by a computer. The network component may optionally be a security back-end. Unless explicitly stated, the order of the flow chart is exemplary and not limiting.

In step 50, a seed and a key may be received. The seed and the key may optionally be received from a server device that is trying to verify the integrity of a client device in communication with the server device.

In step 51, an attestation key may be generated based on the seed, the key and a reference measurement result in response to said receiving. The reference measurement result may be related to the client device whose integrity the server device is trying to verify.

In step 52, an output may be generated. The output may comprise the generated attestation key. The attestation key may optionally be sent to the server device that is trying to verify the integrity of the client device in communication with the server device.

Figure 6:
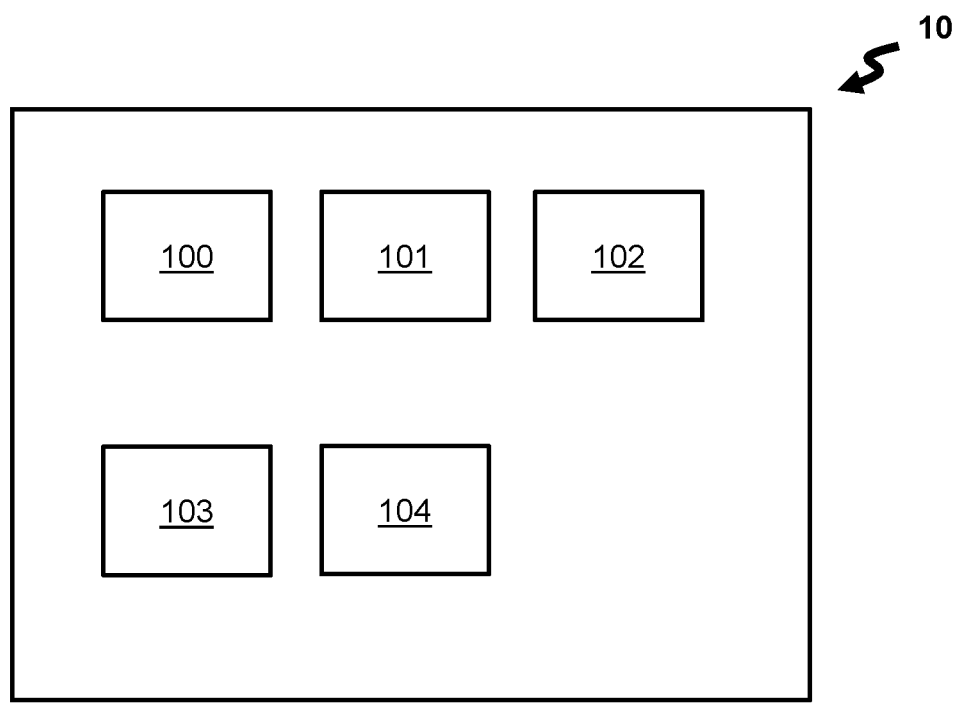
FIG. 6 schematically presents an exemplary block diagram of a client device in accordance with an embodiment of the present disclosure.

FIG. 6 schematically presents an exemplary block diagram of a client device 10 in accordance with an embodiment of the present disclosure.

The client device 10 may participate in network communication. The client device 10 may be configured to send data according to a cryptographic protocol. The cryptographic protocol may use a key. The client device 10 may comprise a memory 100, a data-generation module 101, a measurement module 102, a key-generation module 103, an encryption module 104, and an output-generation module 105. The data-generation module 101 may be configured to generate a data unit and a seed related to the data unit. The measurement module 102 may be configured to generate a measurement result of the client device related to the seed. The key-generation module 103 may be configured to generate an attestation key based on the measurement result. The generation of the attestation key may additionally or alternatively be based on a key. The key may be agreed in accordance with the cryptographic protocol. The encryption module 104 may be configured to encrypt the data unit at least in part based on the attestation key. The output-generation module 105 may be configured to generate an output comprising the encrypted data unit.

Figure 7:
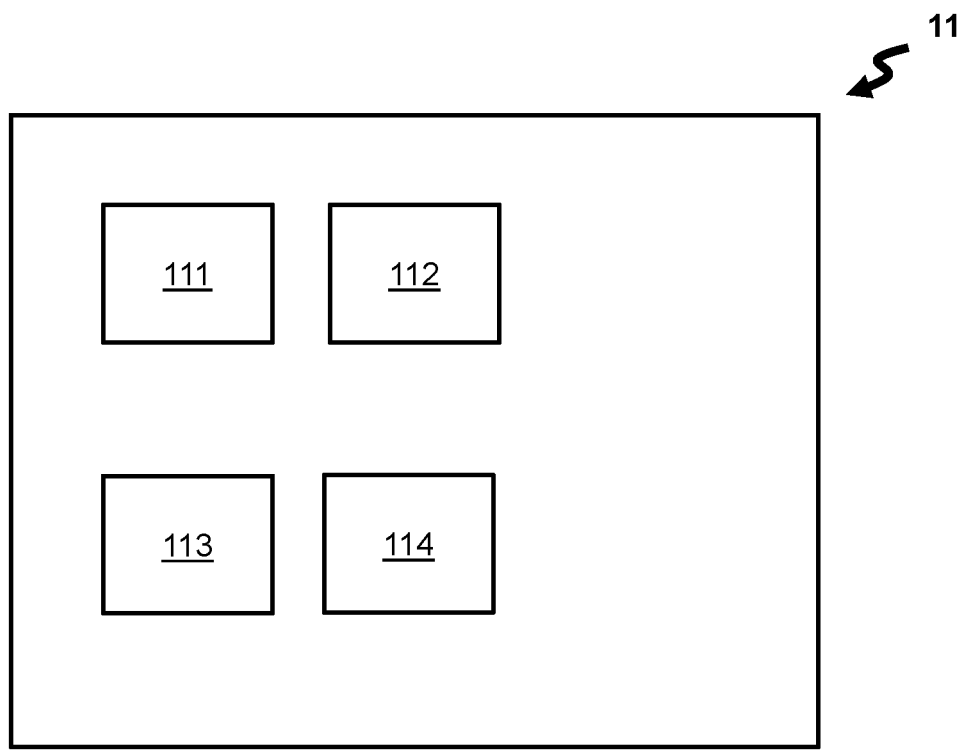
FIG. 7 schematically presents an exemplary block diagram of a server device in accordance with an embodiment of the present disclosure.

FIG. 7 schematically presents an exemplary block diagram of a server device 11 in accordance with an embodiment of the present disclosure.

The server device 11 may participate in network communication. The server device 11 may be configured to receive data according to a cryptographic protocol. The cryptographic protocol may use a key. The received data may come from a client device in secure communication with the server device 11. The server device 11 may comprise a receiving module 111, a derivation module 112, a transmitting module 113, and a decryption module 114. The receiving module 111 may be configured to receive an input comprising an encrypted data unit. The derivation module 112 may be configured to derive a seed related to the encrypted data unit. The transmitting module 113 may be configured to transmit a request for an attestation key based on the seed and the key. The receiving module 111 may be additionally configured to receive the attestation key in response to the request. The decryption module 114 may be configured to decrypt the encrypted data unit at least in part based on the attestation key.

Figure 8:
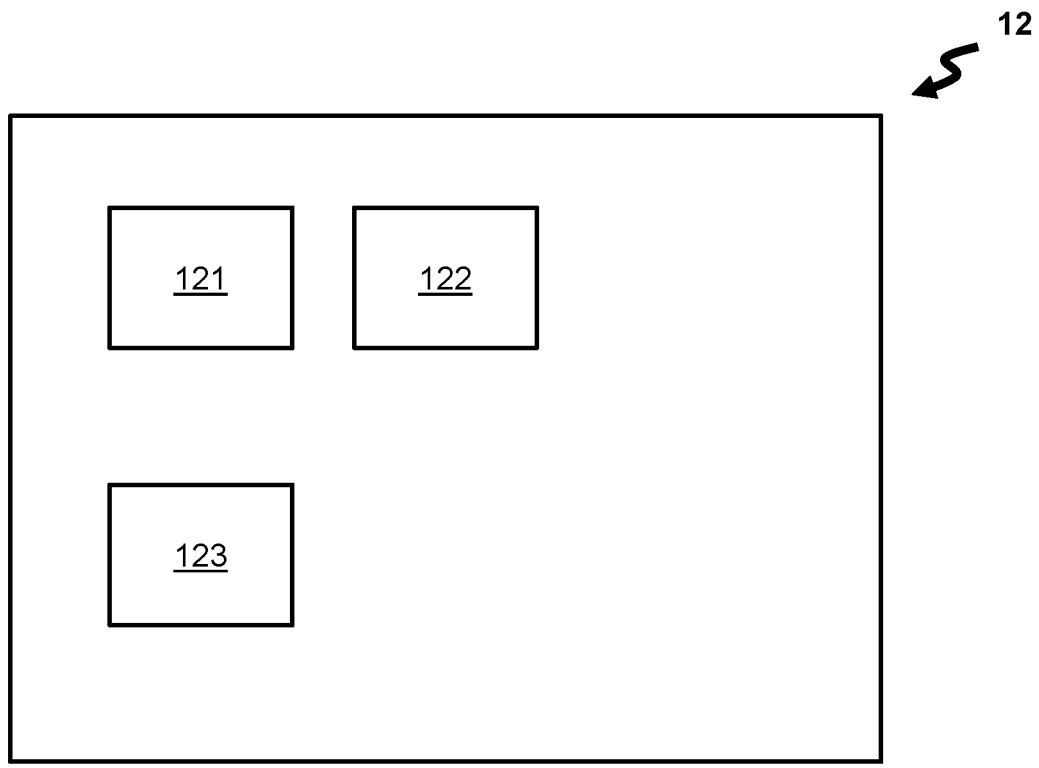
FIG. 8 schematically presents an exemplary block diagram of a network component in accordance with an embodiment of the present disclosure.

FIG. 8 schematically presents an exemplary block diagram of a network component 12 in accordance with an embodiment of the present disclosure.

The network component 12 may participate in a network communication. The network component 12 may be a database. The network component 12 may be a back-end, e.g., a security back-end. The network component 12 may comprise a receiving module 121, a key-generation module 122 and a transmitting module 123. The receiving module 121 may be configured to receive a seed and a key. The key-generation module 122 may be configured to generating an attestation key based on the seed, the key and a reference measurement result in response to said receipt. The transmitting module 123 may be configured to transmit an output comprising the generated attestation key.

In sum, embodiments of the present disclosure provided improved methods and devices to perform remote integrity verification. The improved remote integrity verification may be adapted to cooperate with existing network protection or secure communication protocols. Such adaptation may reduce the impact of remote integrity verification on communication bandwidth and latency. Such adaptation may reduce the impact on device performance and help preserve storage and computational resources.

One or more embodiments of the disclosure may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media (e.g., hard disk drive or any type of solid-state random-access semiconductor memory, flash memory) on which alterable information may be stored.

LIST OF REFERENCE SYMBOLS 1 network
10 client (device)
11 server (device)
12 network component
13 communication channel
100 memory
101 module
102 module
103 module
104 module
105 module
111 module
112 module
113 module
114 module
121 module
122 module
123 module
20 data
21 data
22 data
23 data
3 method
30 step
31 step
32 step
33 step
34 step
4 method
40 step
41 step
42 step
43 step
44 step
5 method
50 step
51 step
52 step

The invention claimed is:

1. A method for use by a client device, wherein the client device comprises a memory and is configured to send data according to a cryptographic protocol that uses a key, wherein the method carried out by the client device includes the steps of:
generating a data unit and a seed related to an order number of the data unit in a communication session;
generating a measurement result corresponding to a calculation performed on a block of a subset of the memory for a secured version of software of the client device, wherein a location of the block of the subset of the memory is selected based on a pseudo-random function applied to the seed related to the order number of the data unit in the communication session;
generating an attestation key based on the measurement result and based on the key;
encrypting the data unit at least in part based on the attestation key; and
generating an output comprising the encrypted data unit.

2. The method of claim 1, wherein the client device is a network communication client.

3. The method of claim 1, wherein the seed is based on a sequence number indicating the order number of the data unit in the communication session.

4. The method of claim 1, wherein the encrypting is in accordance with the cryptographic protocol.

5. The method of claim 1, wherein the seed is based on a session number of the communication session and a sequence number indicating the order number of the data unit in the communication session.

6. The method of claim 1, wherein the communication session is a User Datagram Protocol (UDP) communication session and the seed is a sequence number of the data unit in the UDP communication session.

7. The method of claim 1, wherein the pseudo-random function is a hash function.

8. A method for use by a server device, wherein the server device is configured to receive data according to a cryptographic protocol that uses a key, the method carried out by the server device includes the steps of:
receiving, from a client device, an encrypted data unit as part of a communication session with the client device;
deriving a seed related to an order number of the encrypted data unit in the communication session with the client device;
requesting and receiving, from a network component, a reference attestation key based on (1) the seed, (2) the key, and (3) a reference measurement result, wherein the reference measurement result corresponds to a calculation performed on a block of a subset of a memory for a secured version of software of a reference device accessible to the network component, wherein a location of the block of the subset of the memory is selected based on a pseudo-random function applied to the seed related to the order number of the data unit in the communication session; and
decrypting the encrypted data unit at least in part based on the reference attestation key.

9. The method of claim 8, further comprising reporting to the network component from which the reference attestation key was requested, the result of the decrypting.

10. The method of claim 8, wherein the server device is a network communication server.

11. The method of claim 8, wherein the seed being so determined as to be unique to the encrypted data unit, the seed being a sequence number related to the encrypted data unit.

12. The method of claim 8, wherein the decrypting comprises authenticating the encrypted data unit.

13. A method for use by a network component, the method comprising:
    receiving, from a server device a first seed corresponding to an order number of a first encrypted data unit in a communication session;
    generating a first reference attestation key based on the first seed, a cryptographic key related to the communication session, and a first reference measurement result, wherein the first reference measurement result corresponds to a calculation performed on a first block of a first subset of a reference memory for a secured version of software for a client device, wherein a first location of the first block of the first subset of the reference memory is selected based on a pseudo-random function applied to the first seed corresponding to the order number of the first encrypted data unit in the communication session; and
    generating an output comprising the generated first reference attestation key.

14. The method of claim 13, further comprising:
    receiving a second seed corresponding to an order number of a second encrypted data unit in the communication session;
    generating a second reference attestation key based on the second seed, the cryptographic key related to the communication session, and a second reference measurement result, wherein the second reference measurement result corresponds to the calculation performed on a second block of a second subset of the reference memory different than the first subset, wherein a second location of the second block of the second subset of the reference memory is selected based on the pseudo-random function applied to the second seed corresponding to the order number of the second encrypted data unit in the communication session; and
    generating a second output comprising the generated second reference attestation key.

15. The method of claim 13, wherein the seed is a User Datagram Protocol (UDP) sequence number corresponding to the order number of the first encrypted data unit in the communication session.

16. A client device configured to send data according to a cryptographic protocol that uses a key, the client device comprising:
    a memory;
    one or more processors configured to carry out the steps of:
    generating a data unit and a seed related to an order number of the data unit in a communication session;
    generating a measurement result corresponding to a calculation performed on a block of a subset of the memory of the client device based on a version of a software, wherein a location of the block of the subset of the memory is selected based on a pseudo-random function applied to the seed related to the order number of the data unit in the communication session;
    generating an attestation key based on the measurement result and based on the key;
    encrypting the data unit at least in part based on the attestation key; and
    generating an output comprising the encrypted data unit.

17. A server device configured to receive data according to a cryptographic protocol that uses a key, the server device comprising:
    a memory;
    one or more processors configured to carry out the steps of:
    receiving, from a client device, an encrypted data unit as part of a communication session with the client device;
    deriving a seed related to an order number of the encrypted data unit in the communication session with the client device;
    transmitting a request, to a network component, for a reference attestation key based on the seed and the key;
    receiving, from the network component, the reference attestation key in response to the request, wherein the reference attestation key is generated by the network component based on the seed, the key, and a reference measurement, wherein the reference measurement result corresponds to a calculation performed on a block of a subset of a secured version of software for the client device, wherein a location of the block of the subset of the secured version of the software is selected based on a pseudo-random function applied to the seed related to the order number of the data unit in the communication session; and
    decrypting the encrypted data unit at least in part based on the reference attestation key.

18. A network component for use in a communication network, the network component comprising:
    a memory;
    one or more processors configured to carry out the steps of:
    receiving, from a server device, a first seed corresponding to an order number of a first encrypted data unit in a communication session;
    generating a first reference attestation key based on the first seed, a key related to the communication session, and a first reference measurement result, wherein the first reference measurement result corresponds to a calculation performed on a first block of a first subset of a reference memory for a secured version of software for the client device, wherein a first location of the first block of the first subset of the reference memory is selected based on a pseudo-random function applied to the first seed corresponding to the order number of the first encrypted data unit in the communication session; and
    transmitting an output comprising the generated first reference attestation key.

19. The network component of claim 18, wherein the seed is a User Datagram Protocol (UDP) sequence number corresponding to the order number of the encrypted data unit in the communication session.

\* \* \* \* \*